(12) United States Patent
Aston et al.

(10) Patent No.: US 10,571,894 B2
(45) Date of Patent: Feb. 25, 2020

(54) SINGLE PIECE VEHICLE CONTROL SURFACE AND ASSOCIATED SYSTEMS AND METHODS OF MANUFACTURE

(71) Applicant: The Boeing Company, Chicago, IL (US)

(72) Inventors: Richard W. Aston, Brea, CA (US); Michael J. Langmack, Huntington Beach, CA (US); Matthew J. Herrmann, Rancho Palos, CA (US); Russell W. Cochran, Maryland Heights, MO (US); Philip R. Munoz, Foley, MO (US); Nicole M. Hastings, Redondo Beach, CA (US)

(73) Assignee: The Boeing Company, Chicago, IL (US)

(*) Notice: Subject to any disclaimer, the term of this patent is extended or adjusted under 35 U.S.C. 154(b) by 226 days.

(21) Appl. No.: 15/652,689

(22) Filed: Jul. 18, 2017

(65) Prior Publication Data

US 2019/0025797 A1  Jan. 24, 2019

(51) Int. Cl.
*G05B 19/4099* (2006.01)
*B64F 5/00* (2017.01)
(Continued)

(52) U.S. Cl.
CPC ........ *G05B 19/4099* (2013.01); *B22F 3/1055* (2013.01); *B33Y 10/00* (2014.12);
(Continued)

(58) Field of Classification Search
CPC ...... G05B 19/4099; G05B 2219/49007; G05B 2219/35134; B33Y 50/02; B33Y 10/00;
(Continued)

(56) References Cited

U.S. PATENT DOCUMENTS

2016/0312924 A1* 10/2016 Kolarski ............... F16L 9/18
2016/0375609 A1* 12/2016 Sander ............... B29C 33/02
264/219

(Continued)

OTHER PUBLICATIONS

C. Aghanajafi and S. Daneshmand; "Integration of Three-Dimensional Printing Technology for Wind-Tunnel Model Fabrication"; Journal of Aircraft; pp. 2130-2135; vol. 47, No. 6, Nov.-Dec. 2010.

(Continued)

*Primary Examiner* — Ziaul Karim
(74) *Attorney, Agent, or Firm* — Miller, Matthias & Hull LLP

(57) ABSTRACT

A method of manufacturing a vehicle control surface includes generating, using an electronic controller, a three-dimensional plan for the vehicle control surface. The three-dimensional plan includes, at least, non-vehicular support structure dimensions, for a non-vehicular support structure, and skin dimensions for a skin. The method further includes configuring the dimensions of the non-vehicular support structure based on build environment characteristics associated with an additive manufacturing process of the control surface. The additive manufacturing process is based on the three-dimensional plan. The method further includes fabricating the vehicle control surface, using the additive manufacturing process, based on the three-dimensional plan.

28 Claims, 9 Drawing Sheets

(51) Int. Cl.
*B64C 3/18* (2006.01)
*B64C 3/26* (2006.01)
*B33Y 50/02* (2015.01)
*B22F 3/105* (2006.01)
*B33Y 10/00* (2015.01)

(52) U.S. Cl.
CPC .............. *B33Y 50/02* (2014.12); *B64C 3/187* (2013.01); *B64C 3/26* (2013.01); *B64F 5/00* (2013.01); *B22F 2003/1057* (2013.01); *G05B 2219/35134* (2013.01); *G05B 2219/49007* (2013.01)

(58) Field of Classification Search
CPC ... B64C 3/26; B64C 3/187; B64F 5/00; B22F 2003/1057; B22F 3/1055
See application file for complete search history.

(56) References Cited

U.S. PATENT DOCUMENTS

2017/0239722 A1\* 8/2017 Goehlich ............... B33Y 10/00
2017/0240298 A1\* 8/2017 Goehlich ............... B33Y 10/00
2017/0271711 A1\* 9/2017 Benthien ................... B64C 1/12

OTHER PUBLICATIONS

Hussien A. Hegab; Design for additive manufacturing of composite materials and potential alloys: a review; Manufacturing Rev. 2016, 3, 11; H.A. Hegab; Published by EDP Sciences, 2016; pp. 1-17.

Razvan Udroiu; "Applications of additive manufacturing technologies for aerodynamic tests"; Academic Journal of Manufacturing Engineering, vol. 8, Issue Mar. 2010; pp. 96-101.

\* cited by examiner

SINGLE PIECE VEHICLE CONTROL SURFACE AND ASSOCIATED SYSTEMS AND METHODS OF MANUFACTURE

TECHNICAL FIELD

The present disclosure relates generally to vehicle control surfaces, along with systems and methods for manufacturing such vehicle control surfaces. More particularly, the present disclosure relates to single piece vehicle control surfaces and associated systems and methods of manufacture that utilize additive manufacturing processes.

BACKGROUND

Vehicle control surfaces, such as airfoils for aircraft, hydrofoils for watercraft, and the like, are essential to the functionality of their respective vehicles. To that end, construction of vehicle control surfaces are often constricted by and/or designed in accordance with standards for rigidness and/or wear prevention. Accordingly, design and manufacture of vehicle control surfaces can be performed, with such standards in mind, using a variety of systems and methods of manufacture.

Some example systems and methods of manufacturing vehicle control surfaces utilize additive manufacturing, also commonly referred to as three-dimensional (3-D) printing, to construct component parts of a vehicle control surface, for assembly. Utilizing additive manufacturing in construction of vehicle control surfaces allows for a near limitless amount of design options and allows a designer and/or manufacturer to generate vehicle control surfaces out of a wide variety of suitable materials (e.g., alloys, thermoplastics, etc.). Further, by utilizing additive manufacturing in constructing vehicle control surfaces, costly, previously-utilized construction methods, such as metal casting, may be avoided, thus allowing for cost savings.

However, utilizing additive manufacturing in constructing vehicle control surfaces may introduce new construction issues based on these methods of manufacture. For example, if the vehicle control surface is to be additively manufactured in multiple parts, fasteners and/or joining between such parts may be susceptible to fatigue and/or unwanted stresses. Further, characteristics inherent to the manufacturing environment of an additive manufacturing process may need to be addressed in the design of a vehicle control surface; otherwise, a manufacturer may be at risk of part failure of such vehicle control surfaces, either during the build or during use. Additionally, for greater part performance in operation of a greater vehicle with which such control surfaces are used, it is imperative that the surfaces are of the lightest possible weight; however, in some current, known additive manufacturing processes, light weight vehicle control surfaces may be difficult or impossible to manufacture, due to part failure of thin components, such failure occurring during the manufacturing process. Accordingly, single-piece, light weight, additively manufactured vehicle control surfaces, along with systems and methods for manufacturing such vehicle control surfaces, which account for environmental characteristics of an additive manufacturing process, are desired.

SUMMARY

In accordance with one example, a method of manufacturing a vehicle control surface is disclosed. The vehicle control surface includes, at least, a non-vehicular support structure and a skin. The method includes generating, using an electronic controller, a three-dimensional plan for the vehicle control surface. The three-dimensional plan includes, at least, non-vehicular support structure dimensions, for the non-vehicular support structure, and skin dimensions for the skin. The method further includes configuring the dimensions of the non-vehicular support structure based on build environment characteristics associated with an additive manufacturing process of the control surface. The additive manufacturing process is based on the three-dimensional plan. The method further includes fabricating the vehicle control surface, using the additive manufacturing process, based on the three-dimensional plan.

In accordance with another example, an airfoil, which is manufactured as a single workpiece in an additive manufacturing process, is disclosed. The airfoil includes a skin, the skin being manufactured, via the additive manufacturing process, based on skin dimensions for the skin. The skin dimensions are included in a three-dimensional plan for the airfoil that is used in the additive manufacturing process. The airfoil further includes a non-vehicular support structure that is manufactured, via the additive manufacturing process, based on support dimensions for the non-vehicular support structure. The non-vehicular support structure dimensions are included in the three-dimensional plan and are configured based on build environment characteristics associated with the additive manufacturing process of the airfoil. The non-vehicular support structure is removable from the airfoil upon completion of the additive manufacturing process.

In accordance with yet another example, a system for manufacturing a vehicle control surface, via an additive manufacturing process, is disclosed. The vehicle control surface includes, at least, a non-vehicular support structure and a skin. The system includes a controller, that includes a processor and a memory. The controller is configured to generate a three-dimensional plan for the vehicle control surface, based on one or both of instructions stored on the memory and user input, the three-dimensional plan including, at least, non-vehicular support structure dimensions for the support structure and skin dimensions for the skin. The controller is further configured to configure the dimensions of the non-vehicular support structure based on build environment characteristics associated with the additive manufacturing process, the additive manufacturing process based on the three-dimensional plan. The controller is further configured to generate fabrication instructions, based on the three-dimensional plan, for executing the additive manufacturing process. The system further includes 3-D printer operatively associated with the controller. The 3-D printer including a base plate, upon which a build for the vehicle control surface rests during fabrication, and a powder supply for providing a powdered material to the base plate for each successive layer of the build. The 3-D printer further includes a heat source configured to selectively heat the powdered material to form the build, in a series of layer-wise iterations, and configured to operate in accordance with a toolpath for the heat source to selectively heat the powdered material, for each of the series of layer-wise iterations, the toolpath based, at least, on the fabrication instructions.

While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

Figure 1:
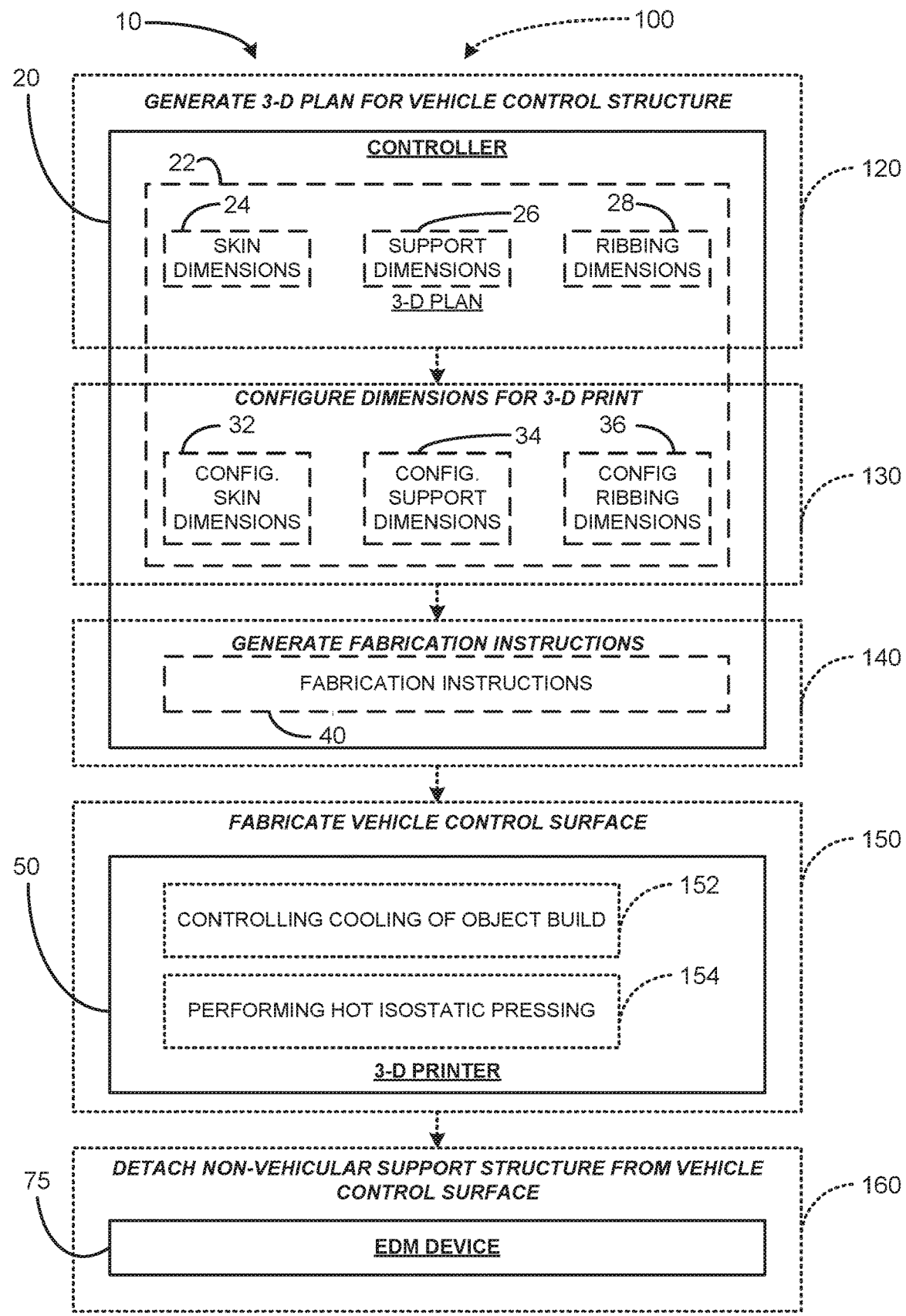
FIG. 1 is a flowchart for an exemplary method for manufacturing a vehicle control surface, illustrated in conjunction with a diagrammatic depiction of elements of an associated system for manufacturing the vehicle control surface, in accordance with an embodiment of the present disclosure.

Turning now to the drawings and with specific reference to FIG. 1, a schematic block diagram of a system 10 for manufacturing a vehicle control surface, which utilizes additive manufacturing, and an associated method 100 for manufacturing a vehicle control surface are depicted. Elements of the system 10 and their associated call out lines are depicted in FIG. 1 with solid lines, while method steps of the method 100 and their associated call out lines are depicted, in FIG. 1, with dotted lines. In FIG. 1, in a merely exemplary configuration of associated use, method steps of the method 100 are overlaid upon elements of the system 10, wherein the element of the system 10, which a method step is overlain, may be used to execute the overlain method step. For example, method steps depicted by blocks 120, 130, 140 may be executed using a controller 20 of the system, the method step of block 150 and associated sub-steps Controlling the Cooling of an Object Build 152 and Performing Hot Isostatic Pressing 154 may be executed using a 3-D printer 50 of the system 10, and the method step Detach Non-Vehicular Support Structure From Vehicle Control Surface of block 160 may be executed using an electrical discharge machining (EDM) tool 75 of the system 10.

Figure 2:
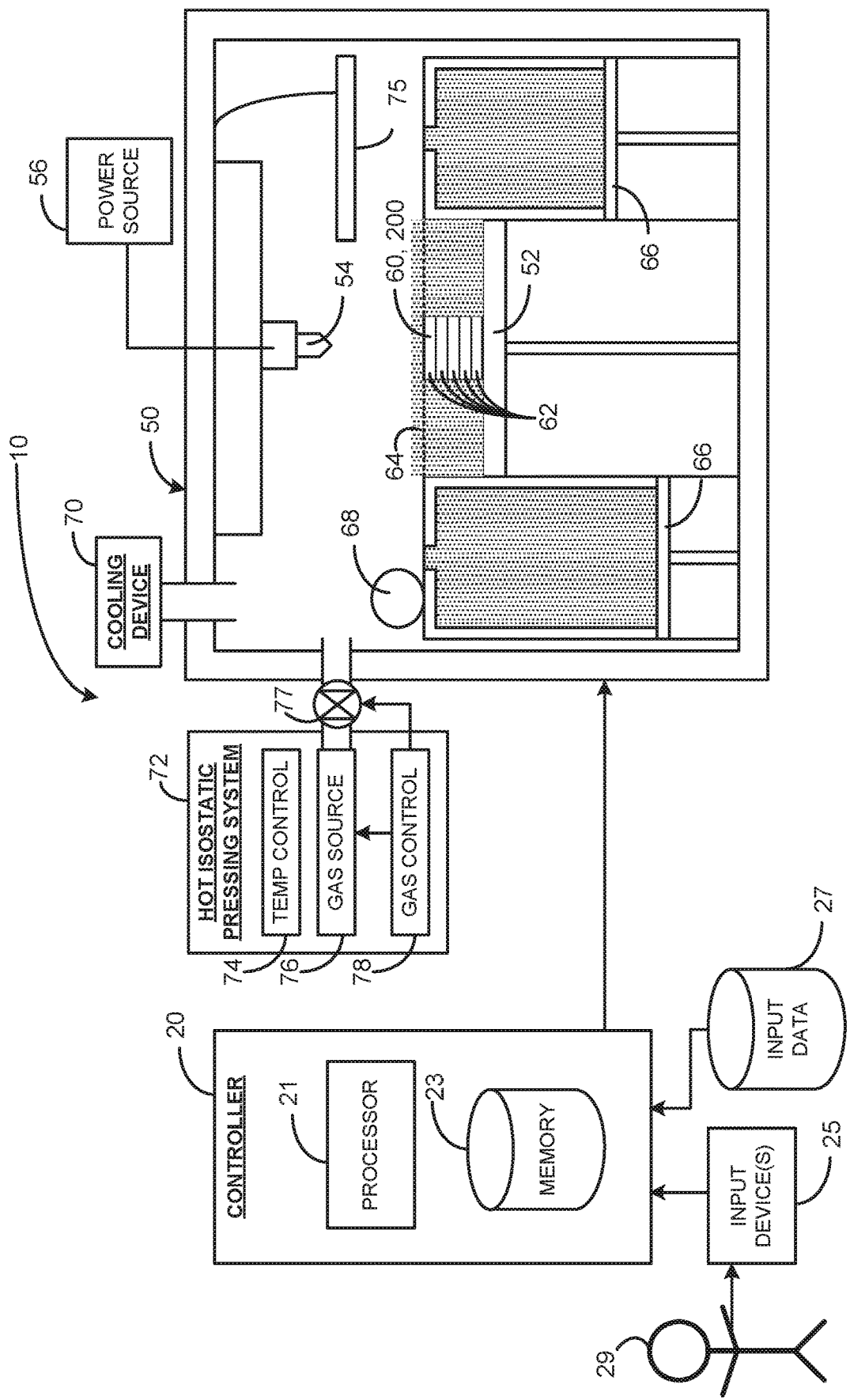
FIG. 2 is a schematic representation of the system for manufacturing vehicle control surfaces, partially represented in FIG. 1, the system including a 3-D printer, associated 3-D printer components, and a controller configured to execute instructions to operate the 3-D printer and/or associated components, in accordance with FIG. 1 and an embodiment of the present disclosure.

The system 10 is illustrated in a more detailed block diagram in FIG. 2. As described above, the system 10 includes, at least, a controller 20 and a 3-D printer 50. The system 10 is configured to additively manufacture a workpiece 60 (e.g., a vehicle control surface), at the 3-D printer 50 based, at least in part, on instructions provided by the controller 20. While certain methods and associated sub-apparatus of the 3-D printer 50 are shown in conjunction with use as a selective laser sintering (SLS) and/or powder bead fusion (PBF) 3-D printer, it is certainly contemplated that alternative 3-D printers and/or techniques may be used in place of the 3-D printer(s) 50 disclosed herein.

The 3-D printer 50 employs a laser 54 to selectively heat portions of a powdered material 64 to form the workpiece 60, in a series of layers 62, during a series of layer-wise iterations of the laser 54. In some examples, the laser 54 is powered by a power source 56, which may vary the level of power based on an output temperature desired for the laser 54. "Layer-wise," generally, refers to the manufacturing of a structure by subdividing the construction into a series of layers and compiling the structure as a series of layers. Each of such a series of layers is performed iteratively by the 3-D printer 50, and, therefore the object 60 is formed in a series of layer-wise iterations. For performing the selective heating, the laser 54 may be any selective heating laser, such as a powder bead fusion laser for performing powder bead fusion. The powdered material 64 may be any type of material that can be selectively heated to form the workpiece 60, which may include, for example, metallic alloys (e.g., Titanium alloys), thermoplastics, and/or any suitable material for additive manufacturing. The powdered material 64 may further include any additives known in the art to aid in bonding, stiffening, or otherwise provide structural support in the manufacturing process of the workpiece 60.

The series of layer-wise iterations of the laser 54 may be controlled in accordance with instructions stored on a memory 23 associated with the controller 20. Prior to each layer-wise iteration of the laser 54, a roller 68 lays a powder layer of the powdered material 64 over a base plate 52, on which the workpiece 60 will rest during 3-D printing. The powdered material 64 may be provided to the roller 68 for spreading by one or more powder beds 66.

After each iteration of the laser 54, the base plate 52 may be lowered by a layer height. Then, another powder layer 64 may be laid over the base plate 52 so that the next iteration of the laser 54 may occur. After each iteration, excess powdered material 64 may remain on the base plate 52 and/or on or within the workpiece 60.

Each layer 62 of the workpiece 60 is selectively heated such that it fuses with the previously heated layer 62. The 3-D printer 50 may continue this process for however many layers 62 are required to manufacture the workpiece 60. Once manufacturing is completed, the workpiece 60 may be removed from the 3-D printer 50. In some examples, the workpiece 60 and/or components thereof may be fused to the base plate 52. In such examples, the workpiece 60 may then be detached from the base plate 52 using, for example, the EDM device 75.

As will be discussed in greater detail below, the controller 20 is configured to generate 3-D plans for the 3-D printer 50 and configure dimensions associated with such 3-D plans. To that end, such 3-D plans may be determined based on models read and/or determined by a processor 21 of the controller 20, stored input data 27 for 3-D plans, user input provided by a user 29 to input device(s) 25, and any combinations thereof. The controller 20 may be any electronic controller or computing system including a processor which operates to perform operations, execute control algorithms, store data, retrieve data, gather data, and/or any other computing or controlling task desired. The controller 20 may be a single controller or may include more than one controller disposed to control various functions of the 3-D printer 50 and/or any other elements of or associated with the system 10. Functionality of the controller 20 may be implemented in hardware and/or software and may rely on one or more data maps relating to the operation of the system 10. To that end, the controller 20 includes the memory 23, which may include internal memory, and/or the controller 20 may be otherwise connected to external memory, such as a database or server. The internal memory and/or external memory may include, but are not limited to including, one or more of read only memory (ROM), random access memory (RAM), a portable memory, and the like. Such memory media are examples of nontransitory memory media. Examples of machine readable media, internal memory, and external memory are discussed in more detail below, with reference to FIG. 11.

As discussed above, the system 10 of FIGS. 1 and 2 and the associated method 100 of FIG. 1 are used for manufacturing a vehicle control surface, such as an airfoil 200, depicted in FIGS. 3-11. While it will be referenced, below, that the systems and methods disclosed herein are for manufacturing the airfoil 200, the systems and methods of the present disclosure may certainly be used to manufacture other airfoils and/or other vehicle control surfaces, such as hydrofoils.

The airfoil 200 includes, at least, a first skin 210 and a non-flight support structure 220. Further, in some examples, the airfoil 200 includes internal ribbing 230. Dimensional characteristics of each of the skin 210, the non-flight support structure 220, and internal ribbing are included in a three-dimensional (3-D) plan 22 for manufacturing the airfoil 200, via the system 10 and/or method 100. As depicted in FIG. 1, any digital information, plans, instructions, or other virtual and/or computer based data associated with the system 10 and/or method 100 is depicted, within the bounds of the controller 20, with dashed lines. Accordingly, such computer-based data elements, such as the 3-D plan 22, skin dimensions 24, support dimensions 26, ribbing dimensions 28, configured skin dimensions 32, configured support dimensions 34, configured ribbing dimensions 36, and/or fabrication instructions 40 may be stored on the memory 23, may be determined by the processor 21, may be derived or based on input from the input device(s) 25, may be received from the input data 27, and/or may be determined and/or accessed by any storage device and/or received from any data input associated with the controller 20.

Returning now to the method 100 of FIG. 1 and with continued reference to the system 10 and the airfoil 200 of FIGS. 3-11, the method 100 includes generating, at the controller 20, the 3-D plan 22 for the airfoil 200, as depicted by block 120. Accordingly, any images of FIGS. 3-11 may be indicative of characteristics of an exemplary 3-D plan 22 for the airfoil 200; however, the 3-D plan 22 is certainly not limited to the airfoil 200 and/or the specific dimensions and/or structural shapes and/or characteristics displayed in FIGS. 3-11. The 3-D plan 22 includes the skin dimensions 24 for the skin 210, which may be any structural dimensions and/or associated build characteristics of the skin 210, to be generated via an additive manufacturing process of the 3-D printer 50. Further, the 3-D plan 22 includes support dimensions 26 for the non-vehicular support structure 220, which may be any structural dimensions and/or associated build characteristics for the non-vehicular support structure 220, to be generated in conjunction with other elements of the airfoil 200, during 3-D printing of the airfoil 200 by the 3-D printer 50. Further, in some examples, the 3-D plan includes ribbing dimensions 28 for the internal ribbing 230, such dimensions may be any structural dimensions and/or associated build characteristics for the internal ribbing 230, to be generated in conjunction with, at least, the skin 210 and the vehicle support structure 220, during additive manufacture of the airfoil 200 by the 3-D printer 50.

The method 100 further includes, at block 130, configuring one or more of the skin dimensions 24, the support dimensions 26, and/or the ribbing dimensions 28 based on build environment characteristics associated with the additive manufacturing process for the airfoil 200, used during fabrication of the airfoil 200 by the 3-D printer 50. To that end, the dimensions 24, 26, 28 may be configured to provide greater tolerances for heat absorption during fabrication by the 3-D printer 50, such that part failure and/or buckling of the skin 210 may be avoided due to optimized distribution of heat during the build process. Further still, one or more of the dimensions 24, 26, 28 may be configured to provide build support during layer-wise production of the airfoil 200 at the 3-D printer 50, via specific structural alterations and/or plans, as discussed in more detail below. Even further still, one or more of the dimensions 24, 26, 28 may be configured to provide egress, from interior cavities and/or volumes of the airfoil 200, for excess powdered material 64 used during fabrication of the airfoil 200. Failure to remove excess powdered material 64 can lead to improper build characteristics.

To that end, at block 120, the support dimensions 26 for the non-vehicular support structure 26 are configured to become configured support dimensions 34. A "non-vehicular" support structure refers to a portion (e.g., the non-vehicular support structure 220) of the airfoil 200 that is 3-D printed, in conjunction with the airfoil 200, as a whole, for build support purposes; however, prior to use of the airfoil 200 as part of an aircraft or other vehicle, the non-vehicular portion (e.g., the non-vehicular support structure 220) of the airfoil 200 is removed from the other elements of the airfoil 200. For example, as discussed above, the non-vehicular support structure 220 may be removed via use of an EDM device 75, such as an EDM wire, to effectively cut the non-vehicular support structure 220 from the airfoil 200 by heated wire, to detach the non-vehicular support structure 220.

The support dimensions 26 are configured such that the airfoil 200 is capable of maintaining proper build characteristics based on environmental characteristics associated with an additive manufacturing process of airfoil 200, by, for example, the 3-D printer 50, based on the 3-D plan 22. Such "environmental characteristics" may be any properties of an environment in which the airfoil 200 is built, such as ambient and/or working temperatures from the additive manufacturing process, surface temperatures of the airfoil 200 during the build, chemical properties within the 3-D printer 50, heat absorption and/or conduction properties of elements of the 3-D printer 50 (e.g., the base plate 52), heat transfer and/or absorption characteristics of the materials used for the build of the airfoil 200 (e.g., the powdered material 62), and/or any other ambient or working conditions associated with the additive manufacturing process for the airfoil 200. To that end, the dimensions 26 of the non-vehicular support structure 220 may be configured to transfer heat and/or distribute heat amongst the airfoil 200 and any components thereof.

Figure 3:
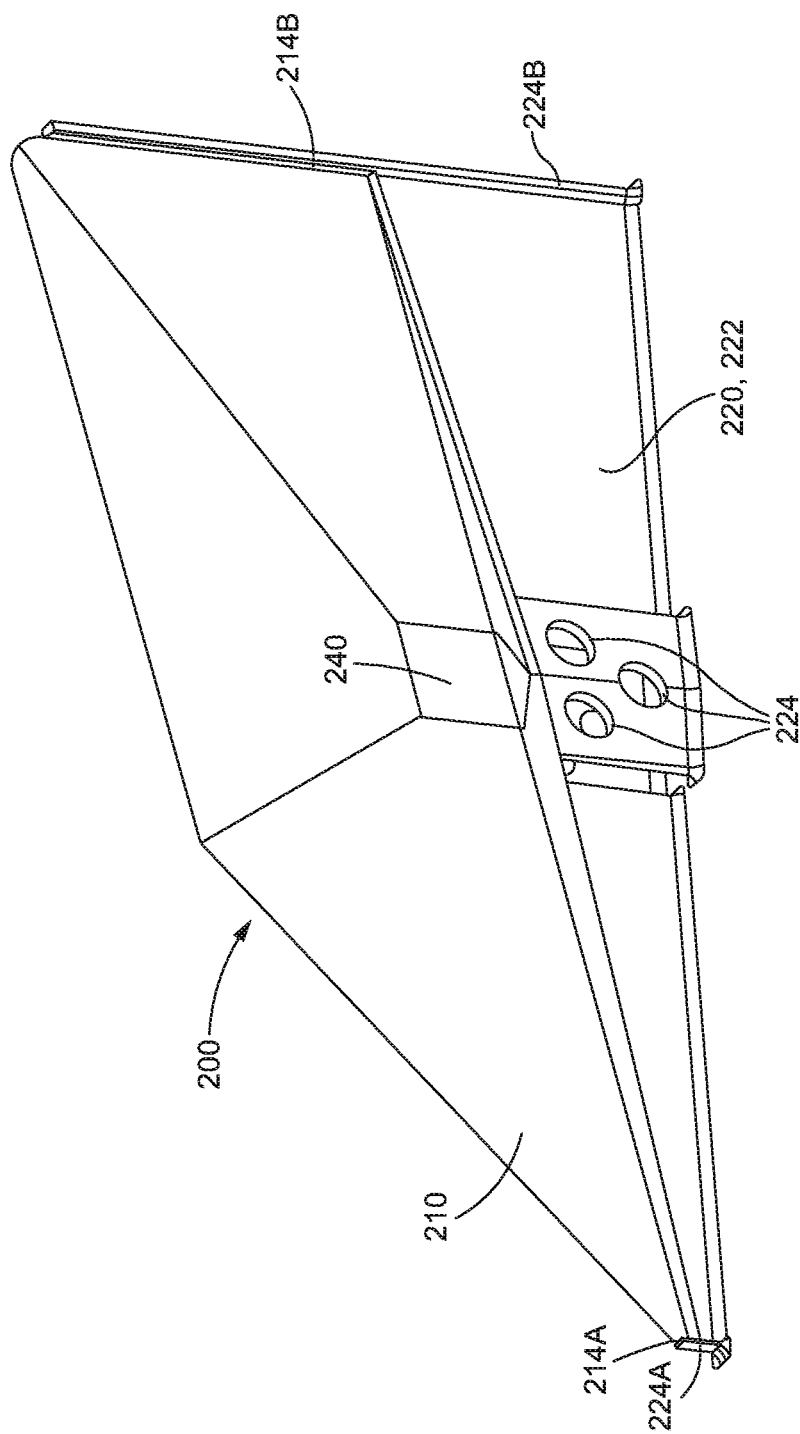
FIG. 3 is a side perspective view of a singular piece airfoil and an associated non-vehicular support structure, both the airfoil and support structure manufactured via an additive manufacturing process, such as the method of FIG. 1, in accordance with an embodiment of the disclosure.

Turning specifically to FIG. 3, the support dimensions 26 of the non-vehicular support structure are configured to generate a "hard" or rigid mount 222 (also may be referenced as rigid body mount 222), having, at least, a rigid body disposed between the skin 210, and any additional components of the airfoil 200, and the base plate 52 during build of the airfoil 200. The rigid mount 222 is configured to conduct heat away from manufactured portions of the skin 210, and any additional components of the airfoil 200 (e.g., the internal ribbing 230), during the additive manufacturing process. For example, the rigid mount 222 may be configured to conduct head away from the flight components of the airfoil 200 (e.g., the skin 210, the internal ribbing 230, etc.) and towards the base plate 52.

Figure 4:
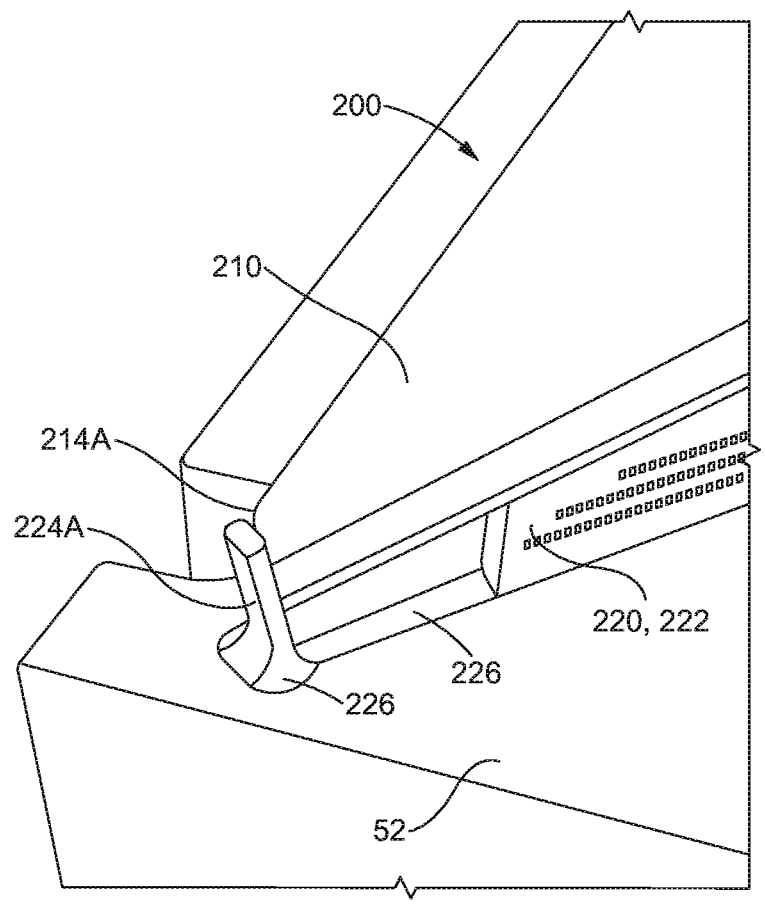
FIG. 4 is a zoomed, side perspective view of a portion of the airfoil and non-vehicular support structure of FIG. 3, in accordance with FIG. 3 and the present disclosure.

In the non-limiting example of the rigid mount 222 shown in FIGS. 3 and 4, the rigid mount 222 may be bound by first and second rods 224A, 224B at first and second ends 214A, 214B of the skin 210, wherein the rigid mount 222 extends between and is supported by the first and second rods 224A, 224B. Further, as best shown in the magnified view of the first end 214A and associated portions of the rigid mount 222, in some examples, the non-vehicular support structure 220 includes filleting 226 between the rigid mount 222 and the base plate 52. Such filleting may allow for greater stability during heat transfer from the rigid mount 222 to the base plate 52 and, thus, avoid structural damage, from heat differentials, at one or both of the non-vehicular support structure 220 and the airfoil 200, as a whole.

Figure 9:
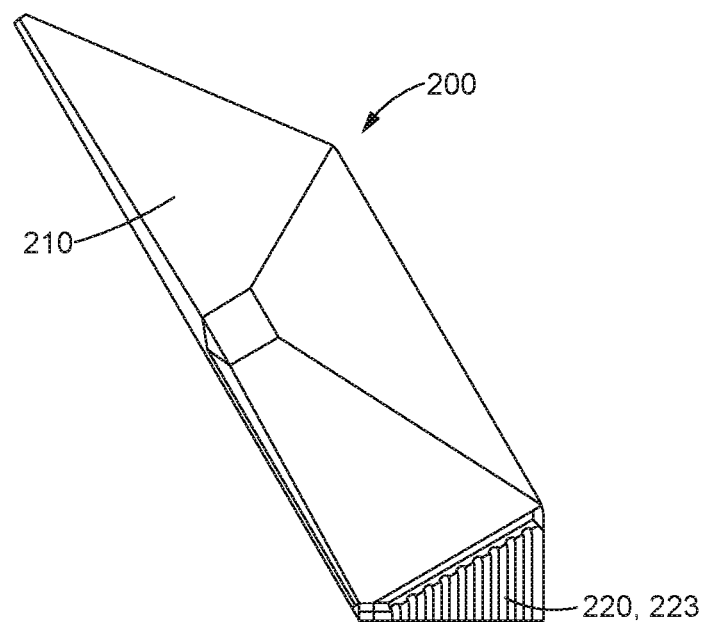
FIG. 9 is a side perspective view of another singular piece airfoil and associated non-vehicular support structure, both the airfoil and support structure manufactured via a manufacturing process, such as the method of FIG. 1, in accordance with an embodiment of the disclosure.
Figure 10:
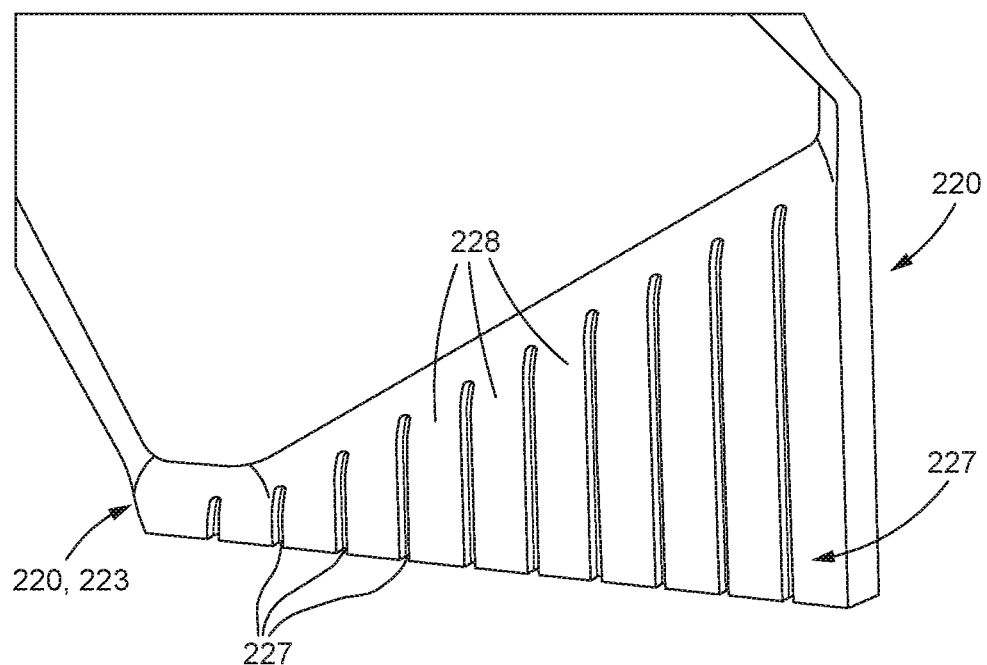
FIG. 10 is a magnified, perspective view of the non-vehicular support structure of the airfoil of FIG. 9, in accordance with FIG. 9 and the present disclosure.

In an alternative to the "hard" or rigid mount 222 based, non-vehicular support structure 220 illustrated in FIGS. 3 and 4, the vehicular support structure 220 may include a "soft" or flexible mount 223, as depicted in FIGS. 9 and 10. Similarly to the rigid mount 222, the flexible mount 223 is configured to conduct heat away from manufactured portions of the skin, and any additional components of the airfoil 200 (e.g., the internal ribbing 230), during the additive manufacturing process. For example, the flexible mount 223 may be configured to conduct heat away from the flight components of the airfoil 200 (e.g., the skin 210, the internal ribbing 230, etc.) and towards the base plate 52.

To that end, the flexible mount 223 is configured to be "flexible," in so much as one or more tabs 228 of the flexible mount 223, defined by a plurality of slits 227 in the flexible mount 223, may expand or contract based on heat transferred to the flexible mount 223. Therefore, utilizing the flexible mount 223, tolerances for different heat magnitude during different stages of the additive manufacturing process of the 3-D printer 50 may be accounted for. Further, the tabs 228 may function as a "spring," to allow support for the airfoil 200, between elements thereof and the base plate 52, when absorbing and/or transferring heat away from vulnerable and/or heat sensitive portions of the airfoil 200. Thus, utilizing the flexible mount 223 may allow for flexible strain relief, from unwanted, excessive heating of portions of the airfoil 200, during fabrication via an additive manufacturing process.

Returning to the method 100 of FIG. 1, the configuring of dimensions performed at block 130 may include configuring the ribbing dimensions 28 associated with the internal ribbing 230 of the airfoil 200, to, for example, achieve configured ribbing dimensions 36. The ribbing dimensions 28 may be configured such that the internal ribbing 230 provides structural support for the skin 210 during vehicular use of the airfoil 200, so that structural integrity of the skin 210 and/or the airfoil 200, as a whole, may be maintained during fabrication via additive manufacturing, so that heat may be transferred and/or distributed via the internal ribbing 230, and/or so that excess powdered material 64, lying on or around the airfoil 200, may be removed during or after fabrication of the airfoil 200. The configured ribbing dimensions 36, thus, may be used as part of the 3-D plan 22, for fabricating the airfoil 200. Accordingly, the configurations and/or characteristics of the internal ribbing 230, discussed below, may be determined and/or applied during the configuration of block 130.

Figure 5:
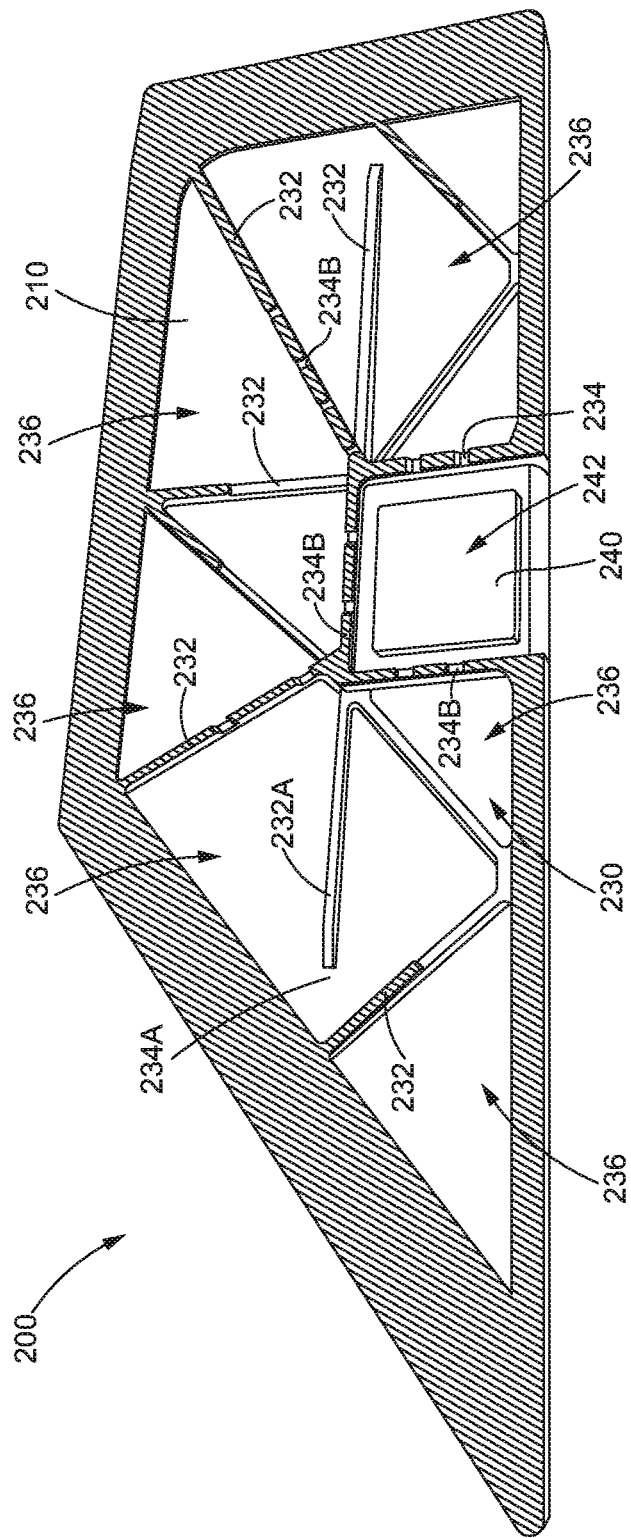
FIG. 5 is a side cross sectional view of the singular piece airfoil of FIG. 3, illustrating an internal support structure of the airfoil, in accordance with FIG. 3 and the present disclosure.

Turning now to the partial, cross-sectional view of the airfoil 200 illustrated in FIG. 5, the internal ribbing 230 of the airfoil 200 includes a plurality of ribs 232. Each of the plurality of ribs 232 need not be dimensionally related to one another and, in fact, members of the plurality of ribs 232 may have various or divergent dimensional characteristics. In some examples and as depicted in FIG. 5, two or more of the plurality of ribs 232 may be arranged, with respect to one another, to form a generally triangular shaped rib grouping 236. The triangular shaped rib groupings 236 may be configured to provide structural support for the airfoil 200, in vehicular scenarios, and/or such groupings 236 may be configured for supporting the skin 210 during the additive manufacturing. Such support is designed to prevent the plurality of ribs 232 or the skin 210 from experiencing structural failure or deformity.

During additive manufacturing fabrication, it has been found that if all the ribs 232 are designed having a consistent height across the entire length of the rib 232, such ribs 232 risk causing the skin 210 to deform and/or buckle due to stresses of the manufacturing process. In other words, if the gradient or rate of change in the height of a rib 232 rapidly shifts from thick to thin, then the skin 210 may be at risk of part failure and/or deformation during additive manufacturing. Therefore, one or more of the ribs 232, such as the exemplary first rib 232A, may be designed to have a variable height that rises or falls, over the course of a length of the rib 232A, wherein the gradient of change in height ($\Delta H$) is configured for proper support of the skin 210 and proper formation of the internal ribbing 230, during fabrication.

Figure 6:
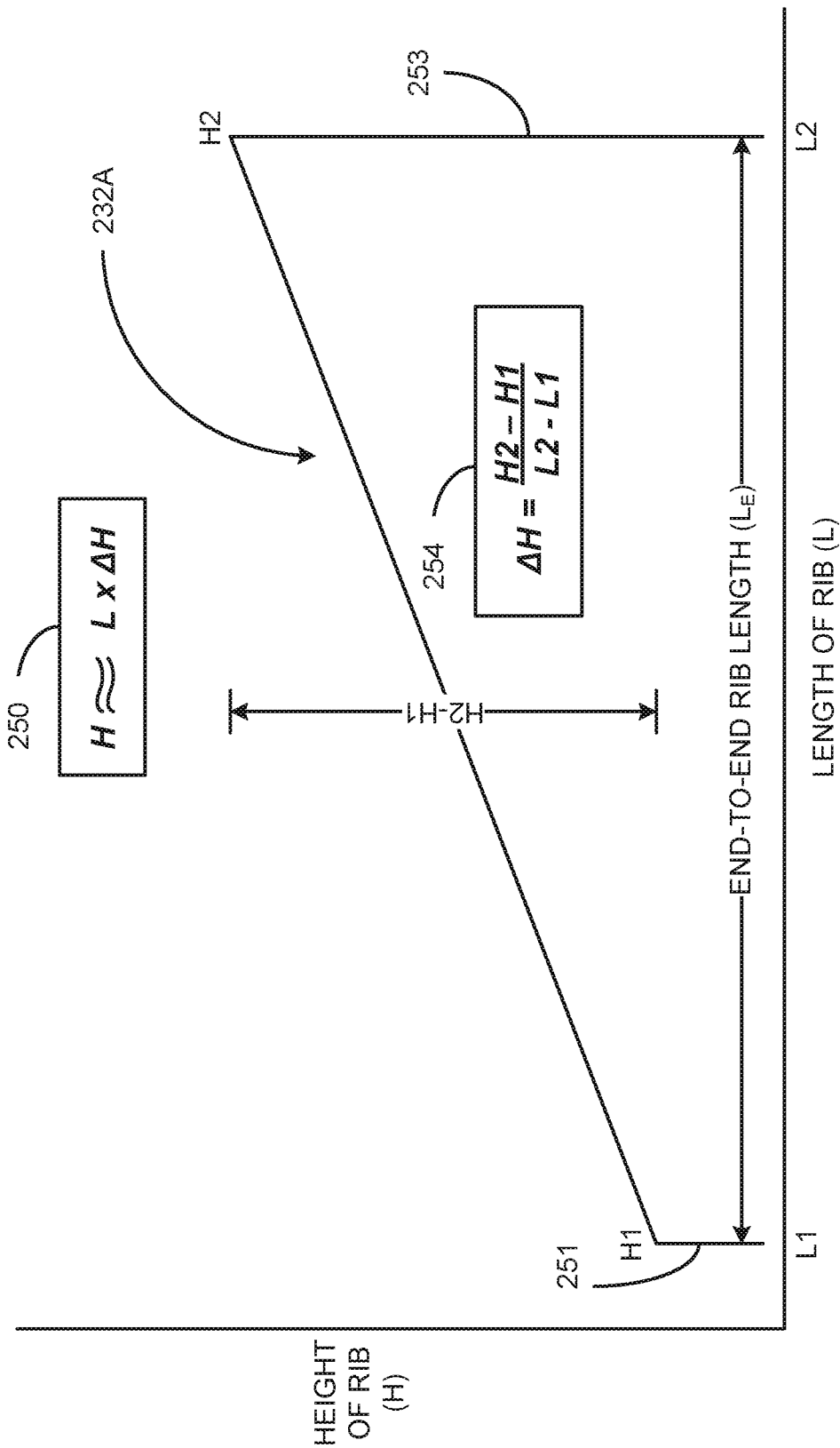
FIG. 6 is a two dimensional side view of an exemplary rib of an internal support structure of the airfoil of FIGS. 3-5, illustrating a relationship indicative of a rate of change in height of the rib along a dimensional length of the rib, in accordance with an embodiment of the present disclosure.

FIG. 6 illustrates a side view of the rib 232A and a simplified, exemplary relationship between the height of the rib 232A (H) and the length of the rib (L), over the course of the fixed length of the rib 232A. In the present example, $L_E$ represents a substantially fixed value for an end-to-end length of the designed rib 232A, whereas H represents the height of rib 232A which is a variable height over the course of $L_E$. $L_E$ extends from a first end 251 of the rib 232A to a second end 253 of the rib 232A. The total change in height of the rib 232 at any point on the course of $L_E$ may be determined based on the gradient $\Delta H$. In the merely exemplary depiction of FIG. 6, the rate of change in height of the rib 232A may be substantially linear; thus, the gradient $\Delta H$ may be defined as a slope of the substantially linear upper bounds of the changing height of rib 232A. To that end, $\Delta H$ may be defined as a slope 254, wherein the slope 254 is defined as a difference between the height at the second end 253 (H2) and the height at the first end 251 (H1) divided by the difference of the length at the second end 253 (L2) and the length at the first end 251 (L1), as shown. Accordingly, the height H of the rib 232A at any length along $L_E$ may be approximated by the substantially linear rib function 250.

Returning now to FIG. 5, as discussed above, the internal ribbing 230, along with other elements of the airfoil 200, may be configured to allow for excess powdered material, from which the airfoil 200, to be removed from surfaces and/or cavities of the airfoil, during or after fabrication via additive manufacturing. To that end, the internal ribbing 230 and/or any other elements of the airfoil 200 may be configured to include a powder network 242, which allows for egress of excess powder, to exit surfaces and/or cavities on the interior of the airfoil 200. Accordingly, the internal ribbing 230 may define a plurality of powder passages 234, through which the excess powder may travel to a pocket 240, defined by the internal ribbing 230 and/or the skin 210, through which the excess powder may exit the airfoil 200. The powder passages 234 may be any egress passage through or around the internal ribbing 230 and/or individual ribs 232 of the internal ribbing. For example, when ribs 232 have decreasing heights, such as the rib 232A, an end of the rib 232 at which the height is decreased may define a powder passage 234A. Further, in some examples, the ribs 232 may, themselves, define holes, cavities, and/or other egress passages 234B within the structure of the rib 232 itself. Via the powder passages 234, the excess powder may reach the pocket 240, from which the excess powder may exit the airfoil 200.

To that end, in some examples, the excess powder may exit the airfoil 200 via further passages and/or other means of powder egress configured into the design of the non-vehicular support structure 220. For example, as can be seen in FIG. 3, the support structure 220, particularly the rigid mount 222, may include one or more egress passages 244 for powder removal during or after fabrication via the additive manufacturing process. Excess powder may follow the powder network 242, to the egress passages 244, where the excess powder is ultimately removed from the airfoil 200. The egress passages 244 may be in structural, powder-flow, communication with the pocket 242. In examples, such as those of FIGS. 9 and 10, the slits 266 may receive powder from the powder network 242 and, thus, provide egress for the excess powder, from the airfoil 200.

Figure 7:
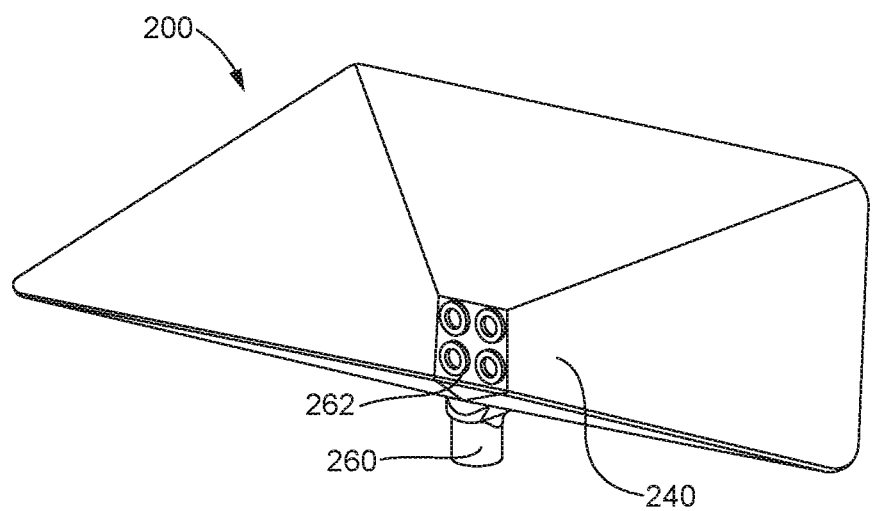
FIG. 7 is another side prospective view of the airfoil of FIG. 3, in which the airfoil has been separated from the non-vehicular support structure, illustrating connectivity of the airfoil with an interface fitting, in accordance with FIG. 3 and the present disclosure.
Figure 8:
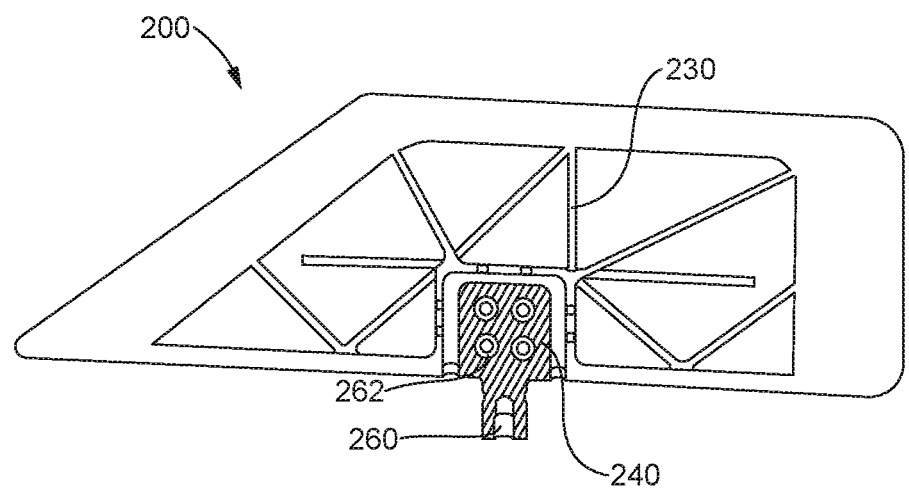
FIG. 8 is a side, cross-sectional view of the airfoil of FIGS. 3 and 7, based on the scenario of FIG. 7, illustrating connectivity of the airfoil with the interface fitting, in accordance with FIGS. 3 and 7 and the present disclosure.

As depicted in FIGS. 7 and 8, the airfoil 200 may be designed and/or configured to interface with an interface fitting 260, once the non-vehicular support structure 220 is removed, which allows the airfoil 200 to be connected to its associated vehicle. In some examples, the airfoil 200 interfaces with the interface fitting 260 at a cavity defined by the pocket 240 associated with the internal ribbing 230. In such examples, the airfoil 200 can be affixed to the interface fitting 260 via one or more connectors 262, such as bolts or other connection devices. Further, to provide greater protection from exterior elements, the interface fitting 260 and the airfoil 200, at the pocket 240, may have sealant applied thereon, once connection is made via the one or more connectors 262. Accordingly, this allows for the single-piece airfoil 200 to include both the skin 210 and an opposing similar skin (not shown) to enclose the airfoil around its perimeter, once the interface fitting 260 is installed, thus mitigating hot gas ingress to the airfoil 200 and maximizing structural efficiency for the airfoil 200.

With the 3-D plan 22 configured, the controller 20 may generate (e.g. determine) fabrication instructions 40 based on the configured 3-D plan 22, as depicted in block 140. Accordingly, the fabrication instructions 40 may be or may include any 3-D printing or additive manufacturing instructions known in the art. For example, the fabrication instructions 40 may be a transformed version of the 3-D plan 22, wherein the 3-D plan 22 is transformed into cross-sections which are then used to form successive layers of the airfoil 200 by the 3-D printer 50. Such fabrication instructions 40 may include toolpath instructions for the 3-D printer 50, generated by such cross-sections and/or the 3-D plan 22, as a whole.

The 3-D printer 50 then fabricates the control surface (e.g., the airfoil 200), as depicted in block 150, based, for example, on the fabrication instructions 40. By manufacturing vehicle control surfaces (e.g., the airfoil 200) in accordance with the method 100 and/or the system 10, it is possible to manufacture vehicle control surfaces as light weight, single-piece control surfaces with, for example, hollow internal pocket(s). Such light weight, single-piece designs may have, previously, been impossible to produce, when using prior, known, 3-D printing or additive manufacturing systems and methods.

In some examples, fabrication of the airfoil 200 may include sub-steps intended to create a more robust build for the airfoil 200, such as the sub-steps represented by blocks 152, 154. At block 154, fabrication of the airfoil 200 may include controlling cooling of the build for the airfoil 200, during fabrication, by either controlling temperatures of the entirety of the interior of the 3-D printer 50 or selectively controlling temperatures of selective volumes within the 3-D printer 50. In such examples, the system 10 may include a cooling device 70 (e.g., a freezer, an air conditioner, a liquid coolant distribution system, and any other cooling devices known in the art) to selectively cool the 3-D printer 50 and any build objects therein.

Further, to improve the structural soundness of the build for the airfoil 200 during fabrication, at block 154, fabrication may include performing hot isostatic pressing on the build for the airfoil 200, within the 3-D printer 50, during or after one or both of a completed build state for the airfoil 200 and a partially complete build state for the airfoil 200. For example, hot isostatic pressing may occur in between builds of successive layers of the build for the airfoil. Hot isostatic pressing is used to reduce the porosity of metals and improve metalloid characteristics. Such processes involve subjecting the metallic component to elevated temperatures and isostatic gas pressures within the 3-D printer 50. To achieve hot isostatic pressing, as shown in FIG. 2, the system 10 may, in some examples, include a hot isostatic pressing system 72. The hot isostatic pressing system 72 may include a temperature control 74, for elevating the temperature within the 3-D printer 50, a gas source 76 for providing the needed gas, and a gas controller 78 for regulating flow of the gas source 76 during hot isostatic pressing, via, for example, a gas valve 77. While the hot isostatic pressing system 72 is depicted as associated with the 3-D printer 50, in the context of the system 10, the hot isostatic pressing system 72 may be completely separate from the 3-D printer 50. For example, hot isostatic pressing on the airfoil 200 may be performed by removing the airfoil 200 from the 3-D printer 50 and placing said airfoil 200 into the hot isostatic pressing system 72 at, for example, a chamber associated or included with the hot isostatic pressing system 72.

After the airfoil 200 is fabricated, as a single piece, the method 100 may continue to detach the non-vehicular support structure 220 from the airfoil 200, as depicted in block 160. As discussed above, such detachment may be accomplished using the EDM device 75. With the non-vehicular support structure 220 removed, the airfoil 200 has been fabricated as one single-piece structure, via additive manufacturing, with no need for further assembly.

Figure 11:
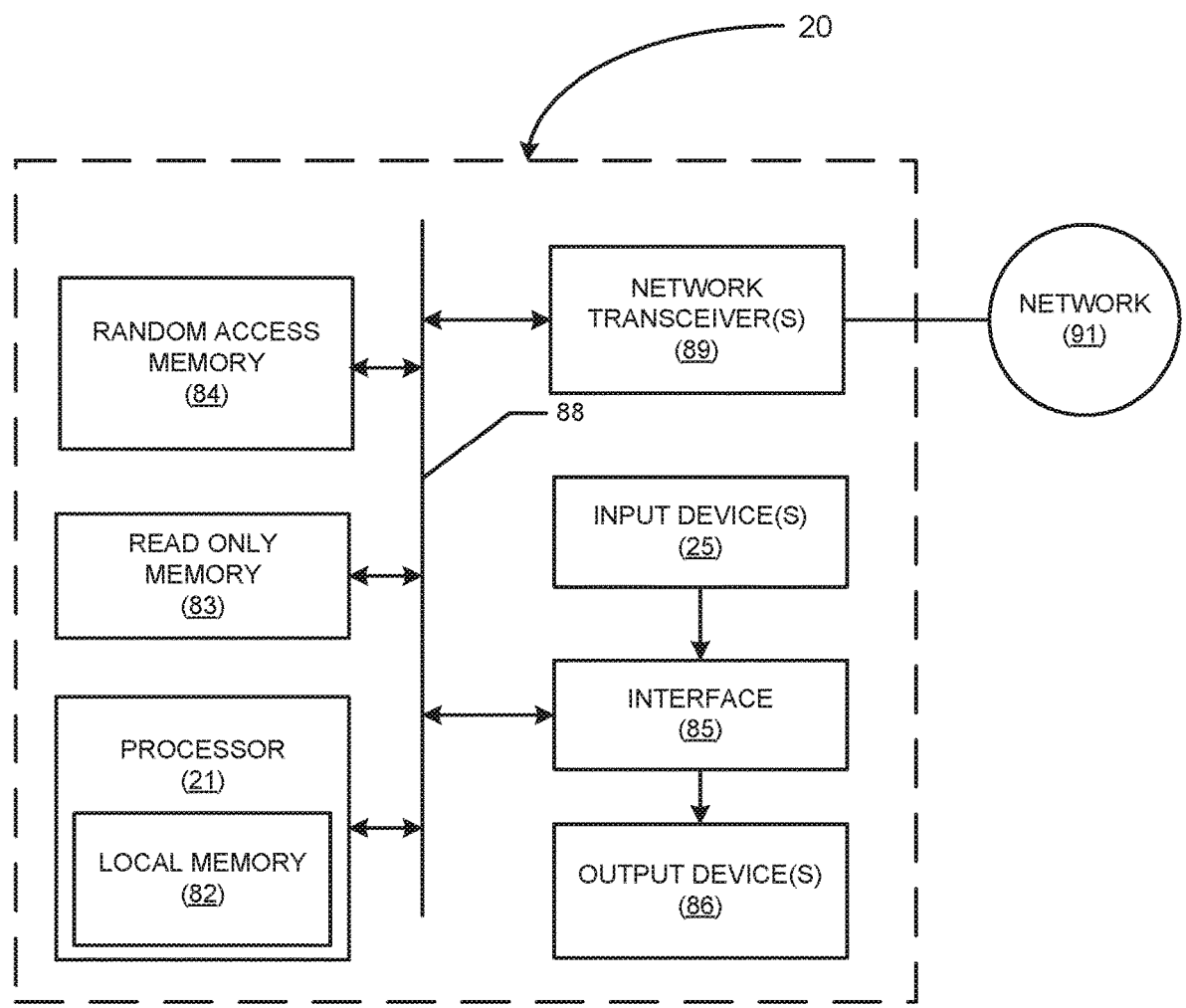
FIG. 11 is a schematic depiction of physical components which may be utilized to, at least in part, embody the controller of FIGS. 1 and 2, in accordance with the present disclosure.

As depicted in FIG. 2, the controller 20 may be a computer associated with or included within the 3-D printer 50. The controller 20 may be hardwired to the 3-D printer 50 or may, additionally or alternatively, transmit instructions to the 3-D printer 50 via a network. FIG. 11 is a block diagram of the controller 20 as a computer capable of executing instructions to direct the 3-D printer 50 to manufacture the airfoil 200. The controller 20 may be, for example, a server, a personal computer, or any other type of computing device. The controller 20 of the instant example includes the processor 21. For example, the processor 21 may be implemented by one or more microprocessors or controllers from any desired family or manufacturer.

The processor 21 may include a local memory 82 and is in communication with a main memory including a read only memory 83 and a random access memory 84 via a bus 88. The random access memory 84 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 83 may be implemented by a hard drive, flash memory and/or any other desired type of memory device.

Further, the controller 20 may also include an interface circuit 85. The interface circuit 85 may be implemented by any type of interface standard, such as, for example, an Ethernet interface, a universal serial bus (USB), and/or a PCI express interface. One or more input device(s) 44 may be connected to the interface circuit 85. The input device(s) 25 permit a user to enter data and commands into the processor 21. The input device(s) 25 can be implemented by, for example, a keyboard, a mouse, a touchscreen, a trackpad, a trackball, and/or a voice recognition system. One or more output devices 86 may also be connected to the interface circuit 85. The output devices 86 can be implemented by, for example, display devices for associated data (e.g., a liquid crystal display, a cathode ray tube display (CRT), etc.).

The controller 20 may include one or more network transceivers 89 for connecting to a network 91, such as the Internet, a Local Area Network (LAN), a Wireless Local Area Network (WLAN), a personal network, or any other network for connecting the controller 20 to the 3-D printer 50, one or more other controllers, and/or other network capable devices. As such, the controller 20 may be embodied by a plurality of controllers 20 for providing instructions to the 3-D printer 50.

As mentioned above the controller 20 may be used to execute machine readable instructions. For example, the controller 20 may execute machine readable instructions to calibrate the 3-D printer 50 and/or to direct the 3-D printer 50 to print the airfoil 200. In such examples, the machine readable instructions comprise a program for execution by a processor, such as the processor 21, shown in the example controller 20. The program may be embodied in software stored on a tangible computer readable medium. Such computer readable medium as used herein refers to any non-transitory medium or combination of media that participates in providing instructions to a processor for execution. Such a medium comprises all computer readable media except for a transitory, propagating signal. For example, such computer readable medium may include a CD-ROM, a floppy disk, a hard drive, a digital versatile disk (DVD), a Blu-ray disk, or any other memory associated with the controller 20.

What is claimed is:

1. A method (100) of manufacturing a vehicle control surface (200), the vehicle control surface including, at least, a non-vehicular support structure (220) and a skin (210), the method comprising:
   generating (120), using an electronic controller (20), a three-dimensional plan (22) for the vehicle control surface, the three-dimensional plan including, at least, non-vehicular support structure dimensions (26), for the non-vehicular support structure, and skin dimensions (24) for the skin;
   configuring (130) the dimensions of the non-vehicular support structure based on build environment characteristics associated with an additive manufacturing process of the control surface, the additive manufacturing process based on the three-dimensional plan;
   generating (140), using the electronic controller (20), fabrication instructions (40), based on the three-dimensional plan, for executing the additive manufacturing process; and
   fabricating (150) the vehicle control surface based on the fabrication instructions using a three-dimensional (3-D) printer (50) operatively associated with the controller (20) to execute the additive manufacturing process, the 3-D printer including:
   a base plate (52) upon which a build (60) for the vehicle control surface rests during fabrication;
   a powder supply (66) for providing a powdered material to the base plate for each successive layer of the build; and
   a heat source (54) configured to selectively heat the powdered material to form the build, in a series of layer-wise iterations (62), and configured to operate in accordance with a toolpath for the heat source to selectively heat the powdered material, for each of the series of layer-wise iterations, the toolpath based, at least, on the fabrication instructions.

2. The method of claim 1, further comprising detaching (160) the non-vehicular support structure from the vehicle control surface and any components thereof.

3. The method of claim 1, wherein configuring the dimensions of the non-vehicular support structure includes designing the non-vehicular support structure as a rigid body mount (222), existing between a base plate, used in the additive manufacturing process, and the skin and any additional components of the vehicle control surface, the rigid body mount configured to conduct heat away from manufactured portions of the skin during the additive manufacturing process.

4. The method of claim 3, wherein configuring the dimensions of the non-vehicular support structure includes configuring filleting in the rigid body mount for manufacturing stress relief.

5. The method of claim 1, wherein configuring the dimensions of the non-vehicular support structure includes designing the support structure to include a plurality of tabs (228) at a first end of the vehicle control surface, the plurality of tabs conducting heat to distribute heat from the vehicle control surface during fabrication via the additive manufacturing process.

6. The method of claim 5, wherein configuring the dimensions of the support structure includes configuring the plurality of tabs for flexible strain relief.

7. The method of claim 1, wherein the vehicle control surface further includes internal ribbing (230) operatively coupled with the skin and configured as structural support for the skin, wherein the three-dimensional plan further includes internal ribbing characteristics (28) for the internal ribbing, and the method further comprising configuring the dimensions of the internal ribbing for providing structural support for the skin and based on the build environment characteristics associated with the additive manufacturing process.

8. The method of claim 7, wherein configuring the dimensions of the internal ribbing includes designing the internal ribbing to include egress passages (234) for removing excess powder during or after fabrication of the vehicle control surface, via the additive manufacturing process.

9. The method of claim 8, wherein configuring the dimensions of the non-vehicular support structure includes configuring the non-vehicular support structure to receive the excess powder, from the egress passages, for powder removal during or after fabrication via the additive manufacturing.

10. The method of claim 7, wherein configuring the dimensions of the support structure further includes altering a height of one or more of ribs of the internal in accordance with a gradual rate of cross sectional change, per a given distance, the gradual rate of cross sectional change being based on characteristics of the additive manufacturing process.

11. The method of claim 10, wherein the gradual rate of cross sectional change is a substantially linear function of the height of the one or more ribs versus the length of the one or more ribs.

12. The method of claim 1, further comprising controlling (152) cooling of the vehicle control surface within an additive manufacturing environment wherein the additive manufacturing process is performed, during one or both of a completed build state for the vehicle control surface and a partially complete build state for the vehicle control surface, the cooling is configured to control residual stresses caused by the additive manufacturing process.

13. The method of claim 12, wherein the additive manufacturing process is a selective laser sintering process including a series of layer-wise iterations, and
wherein controlling cooling of the vehicle control surface includes controlling cooling after each of the series of layer-wise iterations to control residual stresses.

14. The method of claim 1, further comprising performing hot isostatic pressing (154) on the vehicle control surface within an additive manufacturing environment, wherein the additive manufacturing process is performed, during or after one or both of a completed build state for the vehicle control surface and a partially complete build state for the vehicle control surface.

15. An airfoil (200) manufactured as a single workpiece in an additive manufacturing process, the airfoil comprising:
a skin (210) and a non-vehicular support structure (220) manufactured via the additive manufacturing process by:
generating (120), using an electronic controller (20), a three-dimensional plan (22) for the airfoil, the three-dimensional plan including, at least, non-vehicular support structure dimensions (26), for the non-vehicular support structure, and skin dimensions (24) for the skin;
configuring (130) the dimensions of the non-vehicular support structure based on build environment characteristics associated with the additive manufacturing process of the airfoil, the additive manufacturing process based on the three-dimensional plan;
generating (140), using the electronic controller (20), fabrication instructions (40), based on the three-dimensional plan, for executing the additive manufacturing process; and
fabricating (150) the airfoil based on the fabrication instructions using a three-dimensional (3-D) printer (50) operatively associated with the controller (20) to execute the additive manufacturing process, the 3-D printer including:
a base plate (52) upon which a build (60) for the vehicle control surface rests during fabrication;
a powder supply (66) for providing a powdered material to the base plate for each successive layer of the build; and
a heat source (54) configured to selectively heat the powdered material to form the build, in a series of layer-wise iterations (62), and configured to operate in accordance with a toolpath for the heat source to selectively heat the powdered material, for each of the series of layer-wise iterations, the toolpath based, at least, on the fabrication instructions.

16. The airfoil of claim 15, wherein the non-vehicular support structure includes a rigid body mount (222), the rigid body mount existing between a base plate (52), used in the additive manufacturing process, and the skin and any additional components of the airfoil, the rigid body mount being configured to conduct heat away from manufactured portions of the skin and any additional components of the airfoil, during the additive manufacturing process.

17. The airfoil of claim 16, wherein the non-vehicular support structure includes filleting in the rigid body mount for manufacturing stress relief.

18. The airfoil of claim 15, wherein the support structure includes a plurality of slits (226), the plurality of slits for conducting heat to distribute heat amongst the airfoil during fabrication via the additive manufacturing process.

19. The airfoil of claim 18, wherein the plurality of slits are configured for flexible strain relief during manufacture of the airfoil via the additive manufacturing process.

20. The airfoil of claim 15, further comprising internal ribbing (230) operatively coupled with the skin and configured as structural support for the skin, when the airfoil is in use, and configured based on build environment characteristics associated with the additive manufacturing process of the airfoil.

21. The airfoil of claim 20, wherein the internal ribbing defines egress passages (232) for removing excess powder during or after fabrication of the airfoil via the additive manufacturing process.

22. The airfoil of claim 21, wherein the non-vehicular support structure is configured to receive the excess powder from the egress passages, for powder removal during or after fabrication via the additive manufacturing process.

23. A system (10) for manufacturing a vehicle control surface (200) via an additive manufacturing process, the vehicle control surface including, at least, a non-vehicular support structure (220) and a skin (210), the system comprising:
a controller (20), including a processor (21) and a memory (23), the controller configured to:
generate (120) a three-dimensional plan (22) for the vehicle control surface (200), based on one or both of instructions stored on the memory and user input, the three-dimensional plan including, at least, non-vehicular support structure dimensions (26) for the support structure and skin dimensions (24) for the skin, configure (130) the dimensions of the non-vehicular support structure based on build environment characteristics associated with the additive manufacturing process, the additive manufacturing process based on the three-dimensional plan, and generate (140) fabrication instructions (40), based on the three-dimensional plan, for executing the additive manufacturing process; and a three-dimensional (3-D) printer (50) operatively associated with the controller, the 3-D printer including:

a base plate (52) upon which a build (60) for the vehicle control surface rests during fabrication, a powder supply (66) for providing a powdered material to the base plate for each successive layer of the build, and a heat source (54) configured to selectively heat the powdered material to form the build, in a series of layer-wise iterations (62), and configured to operate in accordance with a toolpath for the heat source to selectively heat the powdered material, for each of the series of layer-wise iterations, the toolpath based, at least, on the fabrication instructions.

24. The system of claim 23, wherein the 3-D printer further includes a cooling device (70), configured to control cooling of the build within the 3-D printer during one or both of a completed build state for the build and a partially complete build state for the build, the cooling of the build configured to control residual stresses caused by the additive manufacturing process.

25. The system of claim 24, wherein controlling cooling of the build includes controlling cooling after each of the series of layer-wise iterations to control residual stresses.

26. The system of claim 23, wherein the 3-D printer further includes a system (72) for hot isostatic pressing for performing hot isostatic pressing on the build, during one or both of a completed build state for the vehicle control surface and a partially complete build state for the vehicle control surface, the hot isostatic pressing system including:

a temperature control (74) for managing the temperature within the 3-D printer during hot isostatic pressing, a gas source (76) for providing gas for isostatic pressing; and a gas controller (78) for controlling flow of the gas into the 3-D printer for hot isostatic pressing.

27. The system of claim 23, further comprising an electric discharge machining (EDM) device, configured to detach (160) the non-vehicular support structure from the vehicle control surface, upon completion of the additive manufacturing process.

28. The system of claim 23, wherein the vehicle control surface is an airfoil.

* * * * *